June 22, 1926.
L. B. SMITH
CONFECTIONERY COOLING DEVICE
Filed Sept. 20, 1922    2 Sheets-Sheet 1
1,589,666
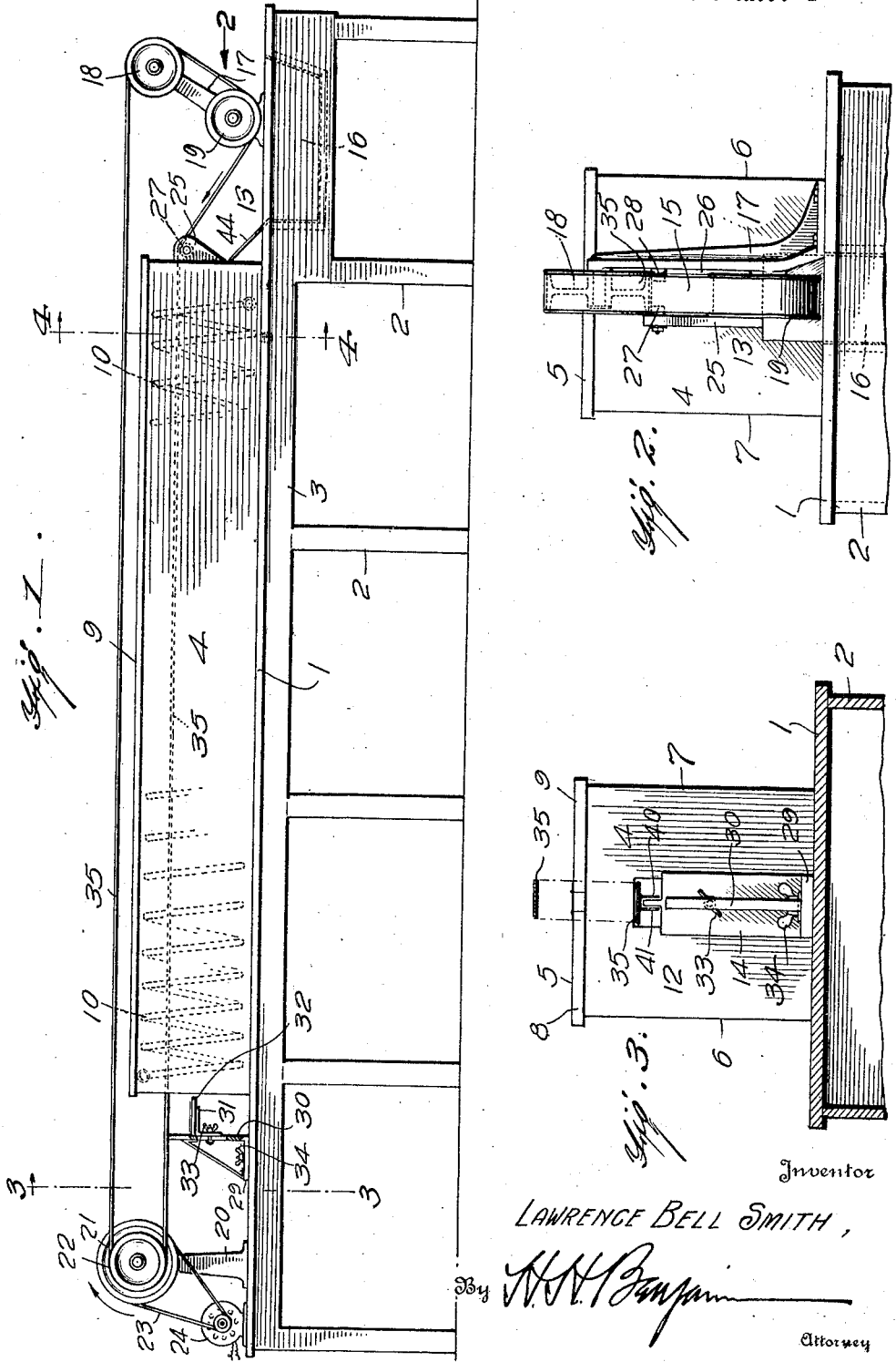
Inventor
LAWRENCE BELL SMITH,
By
Attorney June 22, 1926.
L. B. SMITH
1,589,666
CONFECTIONERY COOLING DEVICE
Filed Sept. 20, 1922   2 Sheets-Sheet 2
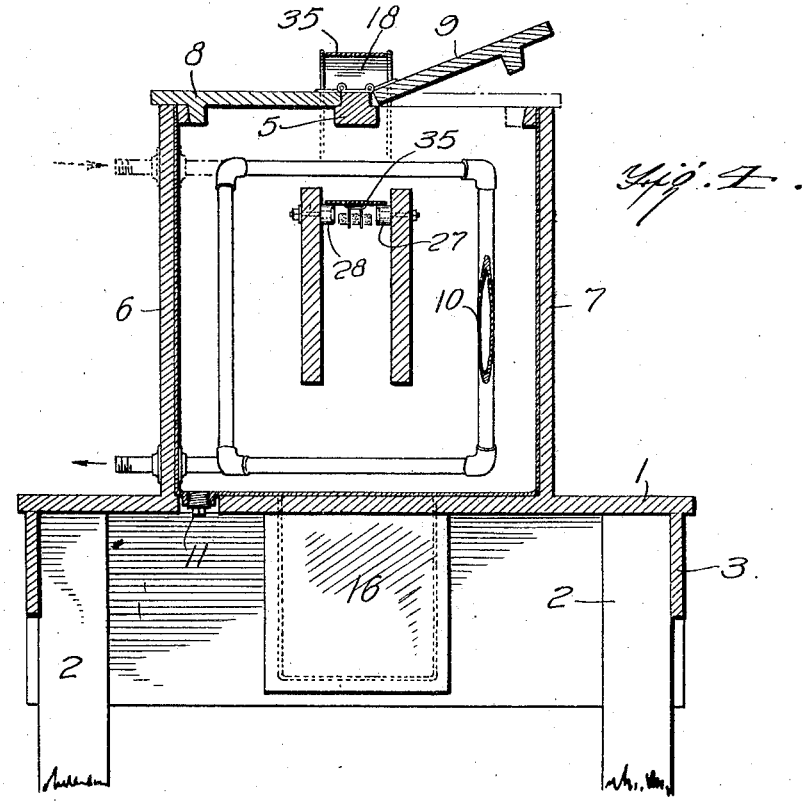
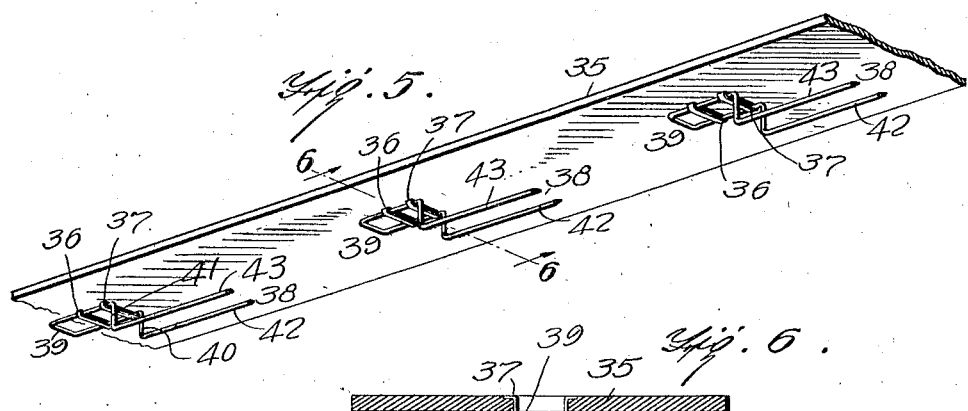
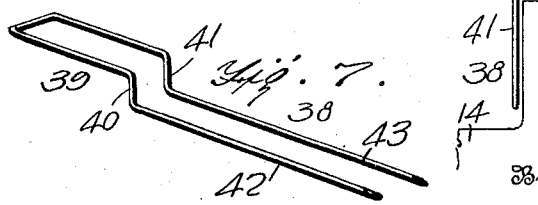
Inventor
LAWRENCE BELL SMITH,
Attorney Patented June 22, 1926.

1,589,666

UNITED STATES PATENT OFFICE.

LAWRENCE BELL SMITH, OF EL DORADO, ARKANSAS, ASSIGNOR OF ONE-THIRD TO TOM MARLIN, OF EL DORADO, ARKANSAS.

CONFECTIONERY-COOLING DEVICE.

Application filed September 20, 1922. Serial No. 589,337.

This invention relates to apparatus for the treatment of coated confections, especially frozen ice cream bars which are provided with a coating of hard chocolate.

After the coating of such bars with semi-liquid coating material, it is desirable that the coating may be congealed and set promptly as otherwise heat absorbed from the coating material will tend to disintegrate the frozen bar. The preferable method of congealing the coating is to submit the bar as soon as coated to an atmosphere of low temperature whereby the heat of the coating is radiated instead of being absorbed by the frozen bar.

An object of my invention is, therefore, to provide means for performing this coating and cooling operation.

A further object of my invention is to provide means which will be entirely automatic in performing this operation, no skill or judgment being required upon the part of the operator other than the mere mechanical labor of feeding the apparatus with material and removing the treated material therefrom.

A further object of my invention is to provide a detachable frame or tray upon which the article to be treated may be supported while being fed to the apparatus and throughout its treatment in the apparatus to prevent distortion of the soft plastic material of which the article is formed.

A further object of my invention is to provide means whereby this operation may be performed as a continuous process, the articles while being treated being also transported whereby the place in which the articles are dipped is spaced some distance from the place where they are wrapped and packed, thus permitting a large output without crowding of the attendants and causing them to interfere with one another.

While this apparatus was particularly designed for the treatment of ice cream bars, it is obvious that it is not confined to such use, as it is suitable for the treatment of other confections and other articles requiring either heating or cooling and in fact is adapted to the treatment of almost any article where time and temperature are the main factors in the treatment.

My invention is capable of various embodiments, one of which, for purposes of illustration, is shown in the annexed drawings and which I will now describe.

In the drawings:

Figure 1 is a side elevation, partly in section of the complete device.

Figure 2 is an end elevation as viewed from the right of Figure 1.

Figure 3 is a section on line 3—3 of Figure 1.

Figure 4 is an enlarged sectional view on the line 4—4 of Figure 1.

Figure 5 is a perspective view of the conveyor belt.

Figure 6 is a section upon line 6—6 of Figure 5.

Figure 7 is a view of one of the trays used with my apparatus.

1 is a table or supporting platform, preferably provided with legs 2 and a skirt 3.

4 is a casing mounted upon the supporting platform and comprising a roof 5 and walls 6 and 7.

The roof is preferably provided with doors 8 and 9 to give access to the interior of the casing.

Within the casing are containers 10 for refrigerant material. These containers are shown as pipe coils of a circulating system but tanks for ice, fluid or a cooling mixture may be used instead.

The casing may be provided with a drain as shown at 11 in Figure 4 and its walls may be lined with suitable heat insulating material not shown.

The casing extends along the greater part of the length of the platform 1 and is provided with end plates 12 and 13 closing the opposite ends of the casing, the said end plates being pierced by comparatively narrow openings 14 and 15 respectively, the casing with its roof, sides and pierced end plates forming a tunnel extending along the top of the platform 1.

Positioned below the top of the platform and to the right of the casing (in Figure 1) is a dipping tank 16, the platform 1 above the tank being cut away to give access to the tank. This tank is shown as a narrow rectangular tank but may have any other desirable form and may be provided, if desired, with suitable heating and filling devices, not shown. A drain board 44 may be provided extending from the opening 15 in the plate 13 to the edge of the tank.

To the right of the tank (in Figure 1) is a standard 17 provided with journals for and supporting pulleys 18 and 19, the said pulleys being positioned over the tank as shown in Figure 1. The pulley 18 being positioned above and further from the casing than the pulley 19, the periphery of said pulley 18 extending to a height above the height of the roof of the casing.

Positioned upon the platform at the other end of the casing is a standard 20 upon which is supported and journaled a pulley 21, the periphery of which corresponds in height to that of the pulley 18. Fast upon the pulley 21 is a drive pulley 22 connected by a belt 23 with a source of power 24, here shown as an electric motor.

Attached to the plate 13 at the tank end of the casing are brackets 25 and 26 and journaled at the top of these brackets are idler rolls 27 and 28 respectively. These rolls are journaled upon stub shafts having an open space between the rolls as clearly shown in Figure 2.

Adjacent to the end of the casing at the motor end of the platform is a bracket 29 carrying an upright 30. The upright 30 is comparatively narrow and positioned opposite the center of the opening 14 in the end plate 12 as clearly shown in Figure 3.

Mounted upon the upright is a bracket 31 carrying a receiving platform 32. Means are provided, shown as a wing nut bolt 33 operating in a slot, to adjust the height of the platform with respect to the upright 30. Means may also be provided for adjusting the bracket 29 toward the casing, such means being indicated by the wing nut 34.

Carried upon the pulleys 18, 19 and 21 and passing over the idlers 27 and 28 is an endless conveyor belt 35. This belt being directed by the pulleys and idlers from the pulley 18 downward, at a slant, around the pulley 19 close to the top of the tank, upwardly, at a moderate angle to the surface of the platform, to the idlers, over the idlers, and horizontally through the tunnel formed by the casing to the pulley 21; around the pulley 21 and horizontally over the roof of the casing to the beginning at the pulley 18.

The speed of the motive power is such that this belt, as long as the apparatus is in operation, is driven slowly and continuously in the direction indicated in the preceding paragraph.

Upon the surface of the belt on the side thereof, opposite to the side in contact with the faces of the pulleys, is a row of spaced apart sockets, positioned preferably along the center line of the belt. These sockets may have any desired form but are shown as formed of a pair of parallel spaced apart wire loops 36 and 37, as clearly shown in Figure 5.

As a support for the article to be treated in the apparatus, I provide the wire tray 38 best shown in Figure 7. This tray is provided with a looped portion 39 which forms a shank adapted to be inserted through loops 36 and 37 forming the sockets on the belt. From said shank side bars 40 and 41 are bent downward at an abrupt angle, and again bent to provide the tine-like support bars 42 and 43 which are substantially parallel with the shank 39, the whole tray having a general bayonet-shaped outline. The number of trays provided depends upon the size and speed of the machine, in general a somewhat larger number of trays are provided than there are sockets on the lower section of the belt.

The operation of the device will be described in connection with the treatment of coated ice cream bars to which it is particularly adapted, although as heretofore stated it is adapted for other uses.

The ice cream bar, previously molded as is well understood, may be slid upon the tray 38, the tine-like supporting bars 42 and 43 being inserted between the bar and its support and the bar lifted very much as it might be lifted with a table fork. The slender tine-like support bars 42 and 43 pass readily under the bar without distorting it. The tray with the bar supported thereon is then carried to the apparatus and the shank of the tray inserted in a socket of the belt, with the shank foremost, that is in the direction of travel of the belt. The shank is made to fit snugly within the socket and being formed of a wire loop more or less springy will be retained by the loop, without further fastening.

The tray with its ice cream bar thereon is preferably inserted in a socket which has reached a position between the pulleys 18 and 19 at the extreme right (as shown in Figure 1). Because of the angle at which the tray must be placed to insert its shank in a socket upon this section of the belt, the ice cream bar will slide down the support bars and rest against the side bars 40 and 41. As the belt moves slowly forward, the tray with the ice cream bar will be carried into the dipping or coating tank 16 where the bar dips in the coating material and receives its coating as is well understood. Leaving the dipping tank, the tray and bar will proceed along that part of the belt positioned between the pulley 19 and the idlers 27 and 28. The upward slant of this part of the belt is moderate and the cementing action of the sticky coating material is sufficient to retain the bar on the tray. From the idlers 27 and 28, the tray and bar supported by the belt proceeds through the tunnel formed by the casing and the bar is subjected to the action of the refrigerant and its coating congealed and hardened as is well understood. Reaching the end of the tunnel (at the left in Figure 1), the belt passes close to the top of the upright 30 and the upright, because of its position under the center of the belt, passes between the side bars 40 and 41 of the tray and gently pushes the ice cream bar from the support bars 42 and 43 onto a wrapper which has been previously placed on the receiving platform 32. The wrapper with the ice cream bar thereon may be removed from the receiving platform by hand. As the tray passes beyond the upright 30, it may be removed from the belt by hand for repeated use. As will be evident because of the slender tine-like form of the supporting bars 42 and 43, the ice cream bar with its congealed and hardened coating will slide easily off the tray when pushed by the upright 30, the metal of the supporting bars being a good conductor of heat, will cause the coating on contact with them to harden quickly and prevent the coating sticking to the bars and the ice cream block may, therefore, be removed readily by the upright 30 without distortion.

While for convenience of description, I have described my apparatus with a single belt, it is to be understood that the apparatus may be made in batteries with several belts, or several rows of sockets on the same belt, and other changes or additions may be made within the spirit of the annexed claims.

What I claim is:

1. A heat exchange apparatus comprising a tunnel, a dipping tank positioned at one end of the tunnel, a movable endless conveyor belt encircling a wall of the tunnel and passing close enough to the liquid level of the tank to cause immersion of articles carried by the belt, and pulleys positioned at opposite ends of the tunnel to support said belt free of the walls of the tunnel and close to the liquid level of the tank.

2. An apparatus for cooling confections and the like comprising a platform, an open-ended casing mounted upon said platform, containers for refrigerant material surrounding the inner walls of said casing, a conveyor adapted to move through said casing adjacent said containers, and supporting and propelling means for said conveyor mounted upon said platform.

3. An apparatus for cooling confections and the like comprising a platform, an open ended casing mounted upon said platform, containers for refrigerant material surrounding the inner walls of said casing, an endless conveyor belt supported by pulleys mounted on the platform at the ends of the casing, said belt passing within the casing in one direction of travel and outside the casing on the return direction of travel, and propulsion means for the belt mounted upon the platform.

In testimony whereof I affix my signature.

LAWRENCE BELL SMITH.